United States Patent
Auvenshine et al.

(10) Patent No.: US 11,526,633 B2
(45) Date of Patent: Dec. 13, 2022

(54) MEDIA EXFILTRATION PREVENTION SYSTEM

(71) Applicant: KYNDRYL, INC., New York, NY (US)

(72) Inventors: John J. Auvenshine, Tucson, AZ (US); Joseph Dawson Davis, III, Roanoke, TX (US); Khwaja Jawahar Jahangir Shaik, Jacksonville, FL (US)

(73) Assignee: Kyndryl, Inc., New York, NY (US)

(*) Notice: Subject to any disclaimer, the term of this patent is extended or adjusted under 35 U.S.C. 154(b) by 0 days.

(21) Appl. No.: 17/004,155

(22) Filed: Aug. 27, 2020

(65) Prior Publication Data

US 2022/0067215 A1 Mar. 3, 2022

(51) Int. Cl.
| | |
|---|---|
| *G06F 21/78* | (2013.01) |
| *G06F 21/44* | (2013.01) |
| *H04L 9/08* | (2006.01) |
| *G06F 11/34* | (2006.01) |
| *G06F 21/30* | (2013.01) |
| *G06F 11/30* | (2006.01) |

(52) U.S. Cl.
CPC .......... *G06F 21/78* (2013.01); *G06F 11/3006* (2013.01); *G06F 11/3495* (2013.01); *G06F 21/30* (2013.01); *G06F 21/44* (2013.01); *H04L 9/0819* (2013.01); *H04L 9/0891* (2013.01); *H04L 9/0894* (2013.01)

(58) Field of Classification Search
CPC .. G06F 11/3006; G06F 11/3495; G06F 21/30; G06F 21/44; G06F 21/78; H04L 9/0819; H04L 9/0891; H04L 9/0894

USPC .......................................................... 713/165
See application file for complete search history.

(56) References Cited

U.S. PATENT DOCUMENTS

| | | | |
|---|---|---|---|
| 5,978,478 A | * 11/1999 | Korematsu | H04L 63/0428 713/151 |
| 9,489,523 B2 | 11/2016 | Kohno | |
| 9,628,473 B1 | 4/2017 | Odom | |
| 9,935,772 B1 | 4/2018 | Madisetti | |
| 10,063,594 B2 | 8/2018 | Winn | |
| 10,262,135 B1 | 4/2019 | Gu | |

(Continued)

OTHER PUBLICATIONS

"A Method and System to Manage Access to USB Storage Devices Based on Policy Definition-Reviewed NHG Aug. 31, 2010," IP.com, IPCOM000209622D, Aug. 11, 2011, 4 pages.

(Continued)

*Primary Examiner* — Bryan F Wright
(74) *Attorney, Agent, or Firm* — John Kennel; George S. Blasiak; Heslin Rothenberg Farley & Mesiti PC

(57) ABSTRACT

A media exfiltration authorization system is provided. A computer device receives a request from an application on a remote device, wherein the request is to store data on an external storage device. The computing device validates that the application is running in protected space on the remote device and includes an established unique identifier. The computing device generates an encryption key for the external storage device based, at least in part, on the validating. The computing device sends the encryption key to the application with authorization for the application to reformat the external storage device, store the requested data on the external storage device, and encrypt the external storage device using the encryption key.

20 Claims, 6 Drawing Sheets

(56) References Cited

U.S. PATENT DOCUMENTS

| | | | |
|---|---|---|---|
| 10,467,230 | B2 | 11/2019 | Alphin, III |
| 10,764,294 | B1* | 9/2020 | Wasiq ............... H04L 63/08 |
| 2006/0136732 | A1* | 6/2006 | Vandermolen ......... G06F 21/10 |
| | | | 713/178 |
| 2014/0019753 | A1 | 1/2014 | Lowry |
| 2018/0307381 | A1 | 10/2018 | Bashir |
| 2019/0042781 | A1 | 2/2019 | Lukacs |
| 2019/0123904 | A1 | 4/2019 | Ackerman |
| 2019/0164156 | A1 | 5/2019 | Lindemann |
| 2019/0253399 | A1 | 8/2019 | Humphries |
| 2019/0325149 | A1 | 10/2019 | Drey |
| 2019/0327150 | A1 | 10/2019 | Hooda |
| 2019/0327272 | A1 | 10/2019 | Narayanaswamy |

OTHER PUBLICATIONS

"USB Trust Extensions for Secured USB Devices," IP.com, IPCOM000245301D, Feb. 26, 2016, 8 pages.

Geambasu et al., "Keypad: An Auditing File System for Theft-Prone Devices," EuroSys'11, ACM, 2011, 15 pages.

Mell et al., "The NIST Definition of Cloud Computing", Recommendations of the National Institute of Standards and Technology, NIST Special Publication 800-145, Sep. 2011, 7 pages.

\* cited by examiner

MEDIA EXFILTRATION PREVENTION SYSTEM

BACKGROUND OF THE INVENTION

The present invention relates generally to the field of system security, and more particularly to data exfiltration.

The proliferation of data and the ability to read/write data is abundant. Often corporations and companies are increasingly concerned with data exfiltration from company owned property. Once data is written to an external storage device it is often difficult to recover data from individuals for the purpose of preventing misuse.

SUMMARY

Embodiments of the present invention provide a method, system, and program product for a media exfiltration authorization system.

A first embodiment encompasses a method for a media exfiltration authorization system. One or more processors receive a request from an application on a remote device, wherein the request is to store data on an external storage device. The one or more processors validate that the application is running in protected space on the remote device and includes an established unique identifier. The one or more processors generate an encryption key for the external storage device based, at least in part, on the validating. The one or more processors send the encryption key to the application with authorization for the application to reformat the external storage device, store the requested data on the external storage device, and encrypt the external storage device using the encryption key.

A second embodiment encompasses a computer program product for a media exfiltration authorization system. The computer program product includes one or more computer-readable storage media and program instructions stored on the one or more computer-readable storage media. The program instructions include program instructions to receive a request from an application on a remote device, wherein the request is to store data on an external storage device. The program instructions include program instructions to validate that the application is running in protected space on the remote device and includes an established unique identifier. The program instructions include program instructions to generate an encryption key for the external storage device based, at least in part, on the validating. The program instructions include program instructions to send the encryption key to the application with authorization for the application to reformat the external storage device, store the requested data on the external storage device, and encrypt the external storage device using the encryption key.

A third embodiment encompasses a computer system for a media exfiltration authorization system. The computer system includes one or more computer processors, one or more computer-readable storage media, and program instructions stored on the computer-readable storage media for execution by at least one of the one or more processors. The program instructions include program instructions to receive a request from an application on a remote device, wherein the request is to store data on an external storage device. The program instructions include program instructions to validate that the application is running in protected space on the remote device and includes an established unique identifier. The program instructions include program instructions to generate an encryption key for the external storage device based, at least in part, on the validating. The program instructions include program instructions to send the encryption key to the application with authorization for the application to reformat the external storage device, store the requested data on the external storage device, and encrypt the external storage device using the encryption key.

DETAILED DESCRIPTION

Detailed embodiments of the present invention are disclosed herein with reference to the accompanying drawings. It is to be understood that the disclosed embodiments are merely illustrative of potential embodiments of the present invention and may take various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the present invention recognize companies are increasingly concerned with preventing accidental and deliberate data exfiltration. An issue with data exfiltration includes mitigating the possibility of data being written to an external storage device such as a USB drive of flash memory card. Generally, writing data to a USB or other external storage device is banned by companies to prevent or mitigate the potential for data exfiltration.

Embodiments of the present invention provide allowing data to be written to an external storage device, where the organization who owns the client devices maintains control of when, where, and by whom the data being written can be read to. Embodiments of the present invention further provide minimal network bandwidth and can read/write at near device native speeds. Such an approach yields the ability for the organization to maintain and exercise strict control over when, where and by whom the data can be read without over encumbering the cloud application.

The present invention will now be described in detail with reference to the Figures.

Figure 1:
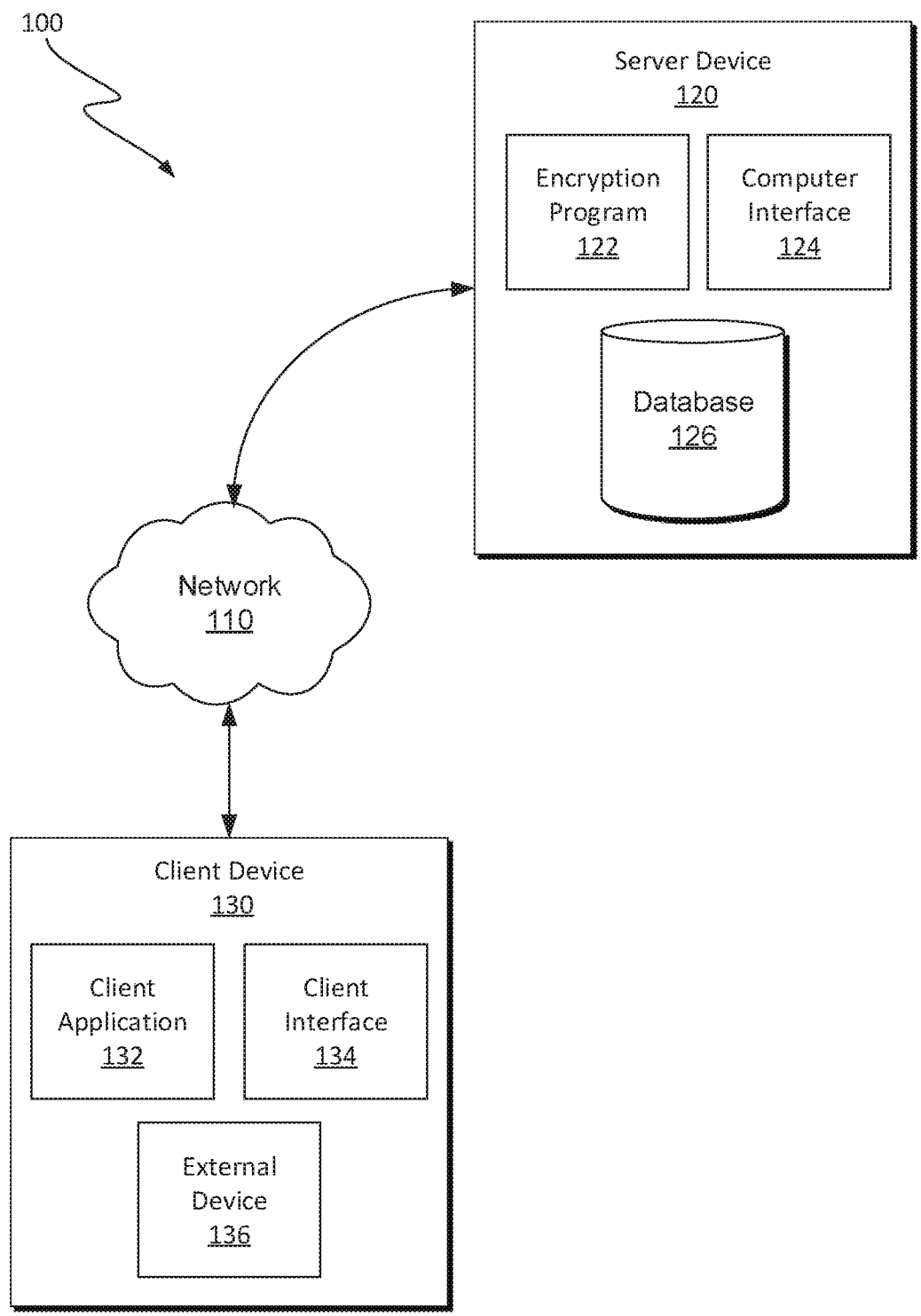
FIG. 1 is a functional block diagram illustrating a computing environment, for a media exfiltration authorization system, in accordance with an exemplary embodiment of the present invention.

FIG. 1 is a functional block diagram illustrating computing environment, generally designated 100, in accordance with one embodiment of the present invention. Computing environment 100 includes server device 120 and computing device 130 connected over network 110. server device 120 includes encryption program 122, computer interface 124, and database 126. Client device 130 includes client application 132, client interface 134, and external device 136.

Server device 120 is a storage system that includes encryption program 122, computer interface 124, and database 126. server device 120 may include one or more, but is not limited to, computing devices, server, server-cluster, web servers, databases, and storage devices. server device 120 operates to communicate with client device 130 and various other computing devices or computing systems (not shown) over a network, such as network 110. For example, server device 120 communicates with encryption program 122 to transfer data between, but is not limited to, client device 130 and various other computing devices or computer systems (not shown) that are connected to network 110. Server device 120 can be any computing device or a combination of devices that are communicatively connected to a local IoT network, i.e., a network comprised of various computing devices including, but are not limited to, client device 130 to provide functionality described herein. Server device 120 can include internal and external hardware components as described with respect to FIG. 6. The present invention recognizes that FIG. 1 may include any number of computing devices, servers, databases, and/or storage devices, and the present invention is not limited to only what is depicted in FIG. 1. As such, in some embodiments, some or all of the features and functions of server device 120 are included as a part of client device 130, and/or various other computing devices or computer systems. Similarity, in some embodiments, some of the features and functions of client device 130 are included as part of server device 120 and/or another computing device or computer system.

Additionally, in some embodiments, server device 120 represents a cloud computing platform. Cloud computing is a model or service delivery for enabling convenient, on demand network access to a shared pool of configurable computing resources (e.g., networks, network bandwidth, servers, processors, memory, storage, applications, virtual machines, and services) that can be rapidly provisioned and released with minimal management effort or interaction with a provider of a service. A cloud model may include characteristics such as on-demand self-service, broad network access, resource pooling, rapid elasticity, and measured service, can be represented by service models including a platform as a service (PaaS) model, an infrastructure as a service (IaaS) model, and a software as a service (SaaS) model, and can be implemented as various deployment models including as a private cloud, a community cloud, a public cloud, and a hybrid cloud.

In various embodiments, server device 120 is depicted in FIG. 1 for illustrative simplicity. However, it is to be understood that, in various embodiments server device 120 can include any number of databases that are managed in accordance with the functionality of an application executing on server device 120. In general, database 126 represents data and an application (e.g., encryption program 122) executing on server device 120 represents code that provides an ability to take specific action with respect to another physical or virtual resource and manages the ability to use and modify the data. In an alternative embodiment, encryption program 122 can also represent any combination of the aforementioned features, in which an application (e.g., encryption program 122) executing on server device 120 has access to database 126. To illustrate various aspects of the present invention, examples of the application (e.g., encryption program 122) executing on server device 120 are presented in which encryption program 122 represents one or more, but is not limited to, a local IoT network and media exfiltration authorization system.

In this exemplary embodiment, database 126 is stored on server device 120. However, in various embodiments, database 126 may be stored externally and accessed through a communication network, such as network 110, as discussed above.

In one embodiment depicted in FIG. 1, encryption program 122 executing on server device 120, at least in part, has access to client application 132 and can communicate data stored on server device 120 to client device 130. Alternatively, client application 132 has access to encryption program 122 executing on server device 120 and can communicate I/O stored on client device 130. In some embodiments, client device 130 and server device 120 have access to various other computing devices (not shown), and can communicate data stored, respectively, on client device 130 and server device 120 to the various other computing devices. For example, encryption program 122 defines media exfiltration authorization system for server device 120 that has access to data on client device 130 and has access to data on other computer systems (e.g., various other computing devices).

In various embodiments of the present invention, client device 130 is a computing device that can be a standalone device, a server, a laptop computer, a tablet computer, a smartphone, a mobile device, a netbook computer, a personal computer (PC), a personal digital assistant (PDA), a desktop computer, or any programmable electronic device capable of receiving, sending, and processing data. In general, client device 130 represents any programmable electronic device or combination of programmable electronic devices capable of executing machine readable program instructions and communications with various other computer systems (not shown). In another embodiment, client device 130 represents a computing system utilizing clustered computers and components to act as a single pool of seamless resources. In general, client device 130 can be any computing device or a combination of devices with access to various other computing systems (not shown) and is capable of executing client application 132, client interface 134, and external device 136. Client device 130 may include internal and external hardware components, as depicted and described in further detail with respect to FIG. 1.

In this exemplary embodiment, client application 132, client interface 134, and external device 136 are stored on client device 130. However, in various embodiments, client application 132, client interface 134, or external device 136 are stored externally and accessed through a communication network, such as network 110, or accessed through external computer cable connections (e.g., USB, USB 3.0, HDMI, ethernet, DVI, USB-C, etc.). Network 110 can be, for example, a local area network (LAN), a wide area network (WAN) such as the Internet, or a combination of the two, and may include wired, wireless, fiber optic or any other connection known in the art. In general, network 110 can be any combination of connections and protocols that will support communications between server device 120, client device 130, and various other computer systems (not shown), in accordance with a desired embodiment of the present invention.

In various embodiments of the present invention, the various other computer systems (not shown) can be a standalone device, a server, a laptop computer, a tablet computer, a netbook computer, a personal computer (PC), a desktop computer, or any programmable electronic device capable of receiving, sending, and processing data, In another embodiment, the various other computer systems represent a computing system utilizing clustered computers and components to act as a single pool of seamless resources. In general, the various other computer systems can be any computing device or combination of devices with access to server device 120, client device 130, and network 110 and is capable of executing encryption program 122, database 126, client application 132, client interface 134 or external device 136. The various other computer systems may include internal and external hardware components, as depicted and described in further detail with respect to FIG. 1.

In the embodiment depicted in FIG. 1, encryption program 122, at least, has access to client program 132 and can communicate data stored on server device 120 to client device 130, and various other computer systems (not shown). More specifically, client interface 134 defines a user of client device 130 that has access to data stored on database 126.

In various embodiments of the present invention, external device 136 defines one or more external storage devices (e.g., USB drive, flash memory, external hard disc drive (HDD), etc.). In various embodiments, external device 136 is connected to client device 130 through computer cable connections or connected over network 110. In some embodiments, external device 136 is connected to various other computer systems (not shown) and communicates with client device 130 over network 110.

In the embodiment depicted in FIG. 1, encryption program 122 utilizes data stored on database 126 to manage access to client application 132, and more specifically, external device 136 in response to an external device usage request from client device 130 (i.e., from a user of client device 130, alternatively referred to herein as "requestor"). More specifically, encryption program 122 defines a cloud-based authorization system that represents a cloud application managed by an organization. Additionally, encryption program 122 generates a universally unique identifier for client device 130.

In various embodiments of the present invention, a local application (e.g., client application 132) runs and executes on a user end-point device (e.g., client device 130). Additionally, in various embodiments of the present invention, a cloud application (e.g., encryption program 122) runs on an organizationally controlled cloud space (e.g., server device 120), wherein the server device 120 is not controlled or operated by the user end-point device (e.g., client device 130).

In various embodiments of the present invention, a user of client device 130 generates an external device usage request utilizing client interface 134 and communicates the external device usage request to client application 132. In various embodiments, the external device usage request includes, one or a combination of: (i) request for authorization to utilize an external storage device for read and write, (ii) data regarding the computing device (IP address, model number, etc.), (iii) data regarding one or more external storage devices (iv) metadata regarding communications between client application 132 and encryption program 122. In various embodiments, client application 132 executing on client device 130 receives the external device usage request and communicates the request to encryption program 122.

In various embodiments, encryption program 122 receives an external device usage request from client device 130. Encryption program 122 analyzes the external device usage request and identifies (i) the computing device (e.g., client device 130), (ii) one or more external storage devices connected to client device 130, and (iii) metadata. In some embodiments, the external device usage request represents one or more security contexts that include, but are not limited to, data exfiltration, suspect activity, generating a universally unique identifier, computing device authorization, or generating an encryption key.

The present invention recognizes that encryption program 122 determines that the one or more external storage devices must be overwritten to comply with the subsequent use of an encryption key. In various embodiments, encryption program 122 generates a set of program instructions and communicates the set of program instructions to client application 132 instructing client application 132 to overwrite external device 136 to comply with the subsequent use of an encryption key. Additionally, the present invention recognizes that the subsequent use of an encryption key allows an organization of server device 120 to authorize a user of client device 130 to store and transfer data from client device 130 to external device 136. In various embodiments, client application 132 overwrites external device 136 and prevents an unauthorized user from accessing the contents of the external storage device. In some embodiments, client application 122 generates a confirmation message and communicates the message to encryption program 122 informing server device 120 that external device 136 has been overwritten with respect to the received set of program instructions.

In various embodiments, encryption program 122 receives the confirmation message and analyzes the confirmation message to verify that external device 136 was properly overwritten. In some embodiments, encryption program 122 determines that external device 136 was properly overwritten. In another embodiment, encryption program 122 determines that external device 136 was not properly overwritten and generates, at least, a second set of program instructions and communicates the set of program instructions to client application 132. Encryption program 122 continuously monitors for subsequent confirmation messages and analyzes the one or more subsequent confirmation messages. In various embodiments, encryption program 122 continuously monitors for subsequent confirmation messages until encryption program 122 determines that external device 126 has been properly overwritten.

In various embodiments, encryption program 122 generates a universally unique identifier (UUID) for external device 136 operating on client device 130. The present invention recognizes that in various embodiments, one or more external device 136 can be connected to client device 130. Additionally, the present invention recognizes that encryption program 122 generates a UUID for each individual external device 136 connected to client device 130 and that the UUID is associated with (i) external device 136 and (ii) client device 130 (e.g., the computing device that external device 136 is authorized to be connected to). In various embodiments, the UUID is specific to a singular computing device (e.g., client device 130) or network share (e.g., various other computer systems) that includes one or a combination of: (i) device type or serial number, (ii) network server or share, (iii) date and time of overwrite, (iv) system name, (v) IP or MAC address for system that was overwritten, etc. In some embodiments, encryption program 122 communicates the UUID to client application 132 with a set of program instructions to store the UUID on the memory of client device 130. In various embodiments, encryption program 122 stores the UUID on database 126 for subsequent use. In some embodiments, encryption program 122 authenticates the UUID with server device 120 for subsequent authorizations between client device 130 and server device 120.

In various embodiments of the present invention, encryption program 122 generates a pseudo-random encryption key. Encryption program 122 generates the encryption key based on, but is not limited to, (i) the UUID for client device 130, (ii) data regarding the computing device (IP address, model number, etc.), and (iii) a pseudo-random generated code. In various embodiments, server device 120 utilizes the encryption key to authenticate the user and client device 130 for subsequent read/write of data to external device 136. Encryption program 122 stores the encryption key on database 126. In some embodiments, encryption program 122 communicates the encryption key to client device 130 with a set of program instructions instructing client application 132 to store the encryption key in the random-access memory (RAM) of client device 130. Additionally, encryption program 122 instructs client application 132 to write the encryption key in plain text on external device 136. The present invention recognizes that the pseudo-random encryption key can be of any length and composition that is supported by encryption systems known in the art. In various embodiments of the present invention, encryption program 122 generates the encryption key utilizing encryption keys that include, but are not limited to, (i) 128 binary digits, 256 binary digits, 1024 binary digits, or 2048 binary digits.

In various embodiments, encryption program 122 communicates the encryption key to client application 132 with a set of program instructions to format external device 136 as an encrypted storage container. In various embodiments, external device 136 can only be read/write to by an authorized user (e.g., an authorized user of client device 130). Additionally, external device 136 remains an encrypted container once disconnected from client device 130. In various embodiments, if external device 136 is connected to a different computing device but remains within the network share of server device 120, encryption program 122 will not authorize the use external device 136. Additionally, encryption program 122 will not authorize external device 136 connected to a different computing device because the UUID stored on the different computing device will not match the UUID and encryption key stored on server device 120. In an alternative embodiment, external device 136 can be disconnected from client device 130 and connected to an authorized computing device owned and operated by the authorized user of client device 130. In various embodiments, the set of program instructions further instruct client application 132 to format external device 136 based on, but is not limited to, the encryption key stored on the RAM of client device 130.

In various embodiments of the present invention, the encryption key stored on the RAM of client device 130 is overwritten. In various embodiments, no encryption key is stored in the RAM of client device 130 because the encrypted container (e.g., external device 136) was closed and the initial encryption key was overwritten based on one or a combination of: (i) client application 132 (e.g., local application) was closed, quit, or terminated, (ii) storage medium is ejected (including, but is not limited to, logically, or physically) or network share is unmounted, (iii) client device 130 is shut down or rebooted, (iv) user's authentication credential is expired or revoked by the organization (e.g., server device 120), or (v) client device 130 or user specific timeout period elapses. In various embodiments, the encryption key is overwritten based on, at least, suspicious behavior. For example, in various embodiments, encryption program 122 identifies suspicious behavior utilizing blockchain for auditability and trackability of the activity occurring on client device 130. Additionally, in various embodiments, encryption program 122 utilizes machine learning to monitor the activity on client device 130 to identify suspicious behavior. Lastly, encryption program 122 identifies when client device 130 is physically located within a threshold distance from the storage device. Encryption program 122 utilizes various ways to detect suspicious behavior occurring with client device 130 and when encryption program 122 identifies that suspicious behavior is occurring communicates a message to the local application to overwrite the encryption key from the RAM located on client device 130.

In various embodiments, client application 132 runs and executes in protected space on client device 130. One having ordinary skill in the art would understand that client application 132 running and executing in protected space means that a user of client device 130 cannot intercept or read communications between client application 132 and encryption program 122. Additionally, a user of client device 130 cannot read or store the decryption key communicated by encryption program 122. One having ordinary skill in the art would understand that client application 132 runs utilizing system credentials with direct access to kernel calls from client device 130.

Figure 2:
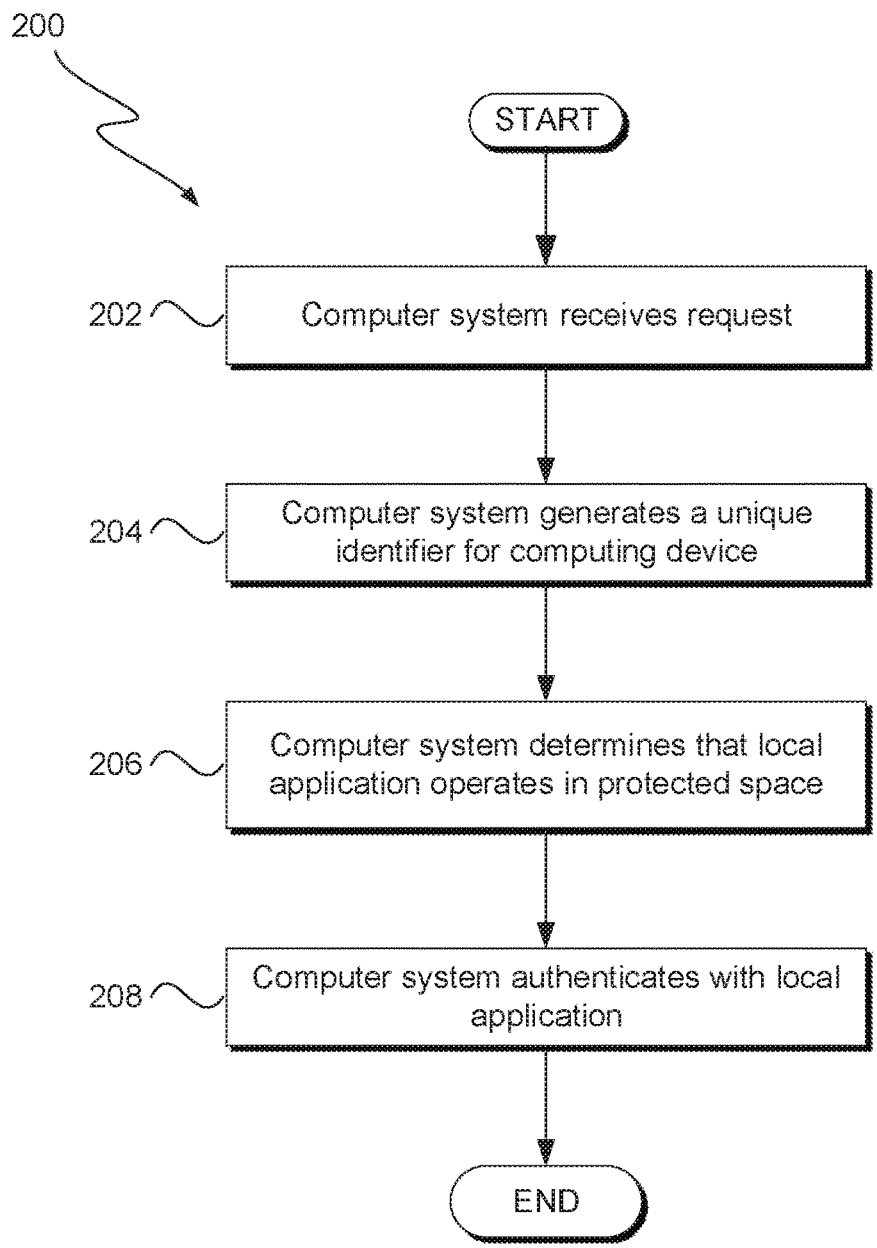
FIG. 2 illustrates operational processes of executing a system for a media exfiltration authorization, on a computing device within the environment of FIG. 1, in accordance with an exemplary embodiment of the present invention.

FIG. 2 is a flowchart depicting operations for executing a media exfiltration authorization system in computing environment 100, in accordance with an illustrative embodiment of the present invention. More specifically, FIG. 2, depicts combined overall operations, 200, of encryption program 122 executing on server device 120, to manage confidential and authorized use of external storage devices connected to client device 130. It should be appreciated that FIG. 2 provides an illustration of one implementation and does not imply any limitations with regard to the environments in which different embodiments may be implemented. Many modifications to the depicted environment may be made. In one embodiment of flowchart 200, the series of operations can be performed in any order. In another embodiment, the series of operations in flowchart 200, can be terminated by any operation, Additionally, any operations of flowchart 200, can be resumed at any time.

In operation 202, encryption program 122 receives an external device usage request from client application 132. In various embodiments encryption program 122 analyzes the external device usage request and identifies (i) request for authorization to utilize an external storage device for read/write, (ii) the computing device (e.g., client device 130), (iii) one or more external storage devices connected to client device 130, and (iv) metadata. In various embodiments, encryption program 122 determines that a user of client device 130 is requesting permission from the organization (e.g., server device 120) to read/write data to external device 136. In various embodiments, encryption 122 denies the request to prevent data exfiltration. In some embodiments, encryption program 122 approves the request and stores data including one or a combination of: (i) the user, (ii) the computing device, (iii) the one or more external storage devices, or (iv) metadata.

In response to encryption program 122 receiving the external storage usage request, encryption program 122 generates a reformat request which includes, but is not limited to, (i) a set of program instructions for client application to reformat and overwrite the whole drive of external device 136 and (ii) a set of program instructions that requires external device 136 is inaccessible without the authenticated user credentials. Encryption program 122 analyzes the data regarding external device 136, wherein the data was received in the request, and determines to overwrite external device 136. In various embodiments, encryption program 122 communicates the reformat request to client application 132 with a set of program instructions. In various embodiments, client application 132 analyzes the reformat request and the set of program instructions and executes an overwrite of external device 136 with respect to the request and set of program instructions. In some embodiments, external device 136 is overwritten and all subsequent uses require authorization by an authenticated user credentials.

In operation 204, encryption program 122 determines that local application (e.g., client application 132) operates in protected space on client device 130. In various embodiments, encryption program 122 further determines that an authenticated user of client device 130 is unable to intercept, store, or read any communications between encryption program 122 and client application 132. In various embodiments, encryption program 122 communicates with client application 132 and requests the user to provide name (also referred to as a digital signature) for client device 130 or the network share. In various embodiments, client application 132 is digitally signed with the organization's public key (e.g., encryption program 122 public key), wherein encryption program 122 can validate the code content of client application 132 (e.g., local application) and that client application 132 has not been subjected to unauthorized modification or tampering. In some embodiments, encryption program 122 receives a name for client device 130 or the network share from client application 132.

In various embodiments of the present invention, encryption program 122 receives the digital signature from client application 132. Encryption program 122 analyzes the digital signature and verifies that the digital signature belongs to an approved external device (e.g., external device 136) connected to client device 130 and that an authorized user is in use of client device 130. Additionally, in various embodiments, encryption program 122 authorizes that the digital signature for client device 130 has not been tampered with. In various embodiments encryption program 122 authorizes the digital signature.

In operation 206, encryption program 122 generates a universally unique identifier (UUID) for one or more external device 136 operating on client device 130, as recognized above. In various embodiments, the UUID is specific to a singular computing device (e.g., one or more external storage device 136) or network share (e.g., various other computer systems) that includes one or a combination of: (i) device type or serial number, (ii) network server or share, (iii) date and time of overwrite, (iv) system name, (v) IP or MAC address for system that was overwritten, etc. Encryption program 122 stores the UUID on database 126 and communicates the UUID to client application 132. In various embodiments, client application 132 receives the UUID with a set of program instructions to store the UUID on client device 130 and when communicating with encryption program 122 to utilize the UUID to for identification.

In operation 208, encryption program 122 (e.g., cloud application) communicates with client application 132 (e.g., local application) to authenticate the communication channel and determine whether client application 132 is operating in a protected space. In various embodiments of the present invention, encryption program 122 authenticates client application 132 based on, but is not limited to, the UUID and further determines that client application 132 is operating in protected space and that the authorized user of client device 130 does not have access to the shared communications between encryption program 122 and client application 132.

In various embodiments of the present invention, encryption program 122 generates an encryption key based on, but is not limited to, a pseudo-random number. In various embodiments, encryption program 122 generates the pseudo-random number based on, but is not limited to, (i) the UUID for client device 130, (ii) data regarding the computing device (IP address, model number, user provided name, etc.), and (iii) a pseudo-random generated code. Encryption program 122 stores the generated encryption key on database 126 in a file location not accessible to authorized users of client device 130. Additionally, in various embodiments, encryption program 122 communicates the encryption key to client application 132 with a set of program instructions. In various embodiments, encryption program 122 instructs client application 132 to store the encryption key only in random-access memory (RAM). The present invention recognizes that an authorized user of client device 130 must have a generated encryption key stored in RAM to access external device 136 (e.g., encrypted storage container) and be able to read/write data to external device 136.

Figure 3:
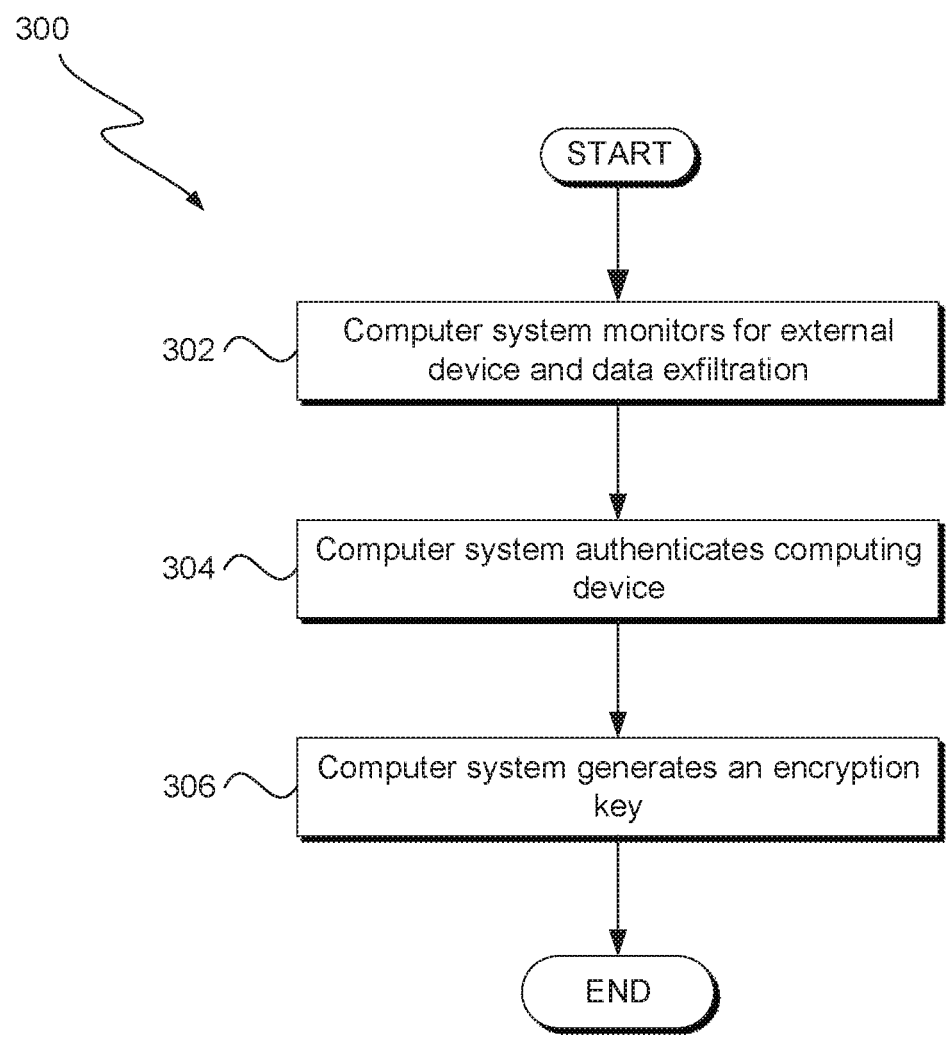
FIG. 3 illustrates operational processes of executing a system for a media exfiltration authorization, on a computing device within the environment of FIG. 1, in accordance with an exemplary embodiment of the present invention.

FIG. 3 depicts a flowchart depicting operations for executing authorization and decrypting an encryption key for a media exfiltration authorization system for computing environment 100, in accordance with an illustrative embodiment of the present invention. More specifically, FIG. 3, depicts combined overall operations, 300, of encryption program 122. In some embodiments, operations 300 represents logical operations of encryption program 122 executing on server device 120. Further, operations 300 can include a portion or all of combined overall operations of 200. It should be appreciated that FIG. 3 provides an illustration of one implementation and does not imply any limitations with regard to the environments in which different embodiments may be implemented. Many modifications to the depicted environment may be made. In one embodiment of flowchart 300, the series of operations can be performed in any order. In another embodiment, the series of operations of flowchart 300 can be performed simultaneously. Additionally, the series of operations, in flowchart 300, can be terminated at any operation. In addition to the features previously mentioned, any operation of flowchart 300 can be resumed at any time.

In operation 302, encryption program 122 actively monitors for one or more external devices connected to client device 130 and actively monitors for one or more external device usage requests. In various embodiments, encryption program 122 receives an external device usage request as recognized above. In various embodiments, encryption program 122 authorizes the user of client device 130 and authenticates the use of external device 136 connected to client device 130.

In various embodiments, encryption program 122 actively monitors client device 130 for data exfiltration. In various embodiments, encryption program 122 identifies that an authorized user of client device 130 wishes to read/write data stored on client device 130 to external device 136. Encryption program 122 requests the UUID stored on client device 130 and the validation that an encryption key is stored on the RAM of client device 130. Encryption program 122 receives the stored UUID and the validation that the encryption key is stored on the RAM from client application 132. Encryption program 122 analyzes the UUID and the validation and authenticates the authorized user to read/write data to external device 136.

In operation 304, encryption program 122 authenticates external device 136 connected to client device 130. In various embodiments of the present invention, an authorized user wishes to read/write to external device 136. Encryption program 122 requests the UUID stored on client device 130 and validation that an encryption key is stored on the RAM of client device 130. In various embodiments, no encryption key is stored in the RAM of client device 130 because the encrypted container (e.g., external device 136) was closed and the initial encryption key was overwritten based on one or a combination of: (i) client application 132 (e.g., local application) was closed, quit, or terminated, (ii) storage medium is ejected (including, but is not limited to, logically, or physically) or network share is unmounted, (iii) client device 130 is shut down or rebooted, (iv) user's authentication credential is expired or revoked by the organization (e.g., server device 120), or (v) client device 130 or user specific timeout period elapses. In response to encryption program 122 not identifying an encryption key stored in the RAM of client device 130, encryption program 122 determines to authorize the use of external device 136 with client device 130.

In operation 306, encryption program 122 generates, at least, a second encryption key for client device 130 to be stored in the RAM of client device 130. In various embodiments, encryption program 122 requests an external device usage request which includes, one or a combination of, but is not limited to, (i) the UUID and (ii) the authorized user's credentials of client device 130. In various embodiments, encryption program 122 analyzes the UUID and the authorized user's credentials and authorizes the use of external device 136 connected to client device 130. In various embodiments of the present invention, encryption program 122 generates, at least, a second encryption key for client device 130, as recognized above. Encryption program 122 stores the generated encryption key on database 126 in a file location not accessible to authorized users of client device 130. Additionally, in various embodiments, encryption program 122 communicates the encryption key to client application 132 with a set of program instructions. In various embodiments, encryption program 122 instructs client application 132 to store the encryption key only in random-access memory (RAM). Embodiment of the present invention recognize that an authorized user of client device 130 must have a generated encryption key stored in RAM to access external device 136 (e.g., encrypted storage container) and be able to read/write data to external device 136. Embodiments of the present invention recognize that the encryption key being stored in the RAM of client device 130 allows the authorized user of client device 130 to read/write data to external device 136. In various embodiments, encryption program 122 actively monitors for one or more external device usage requests from client device 130 or various other computer systems (not shown).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
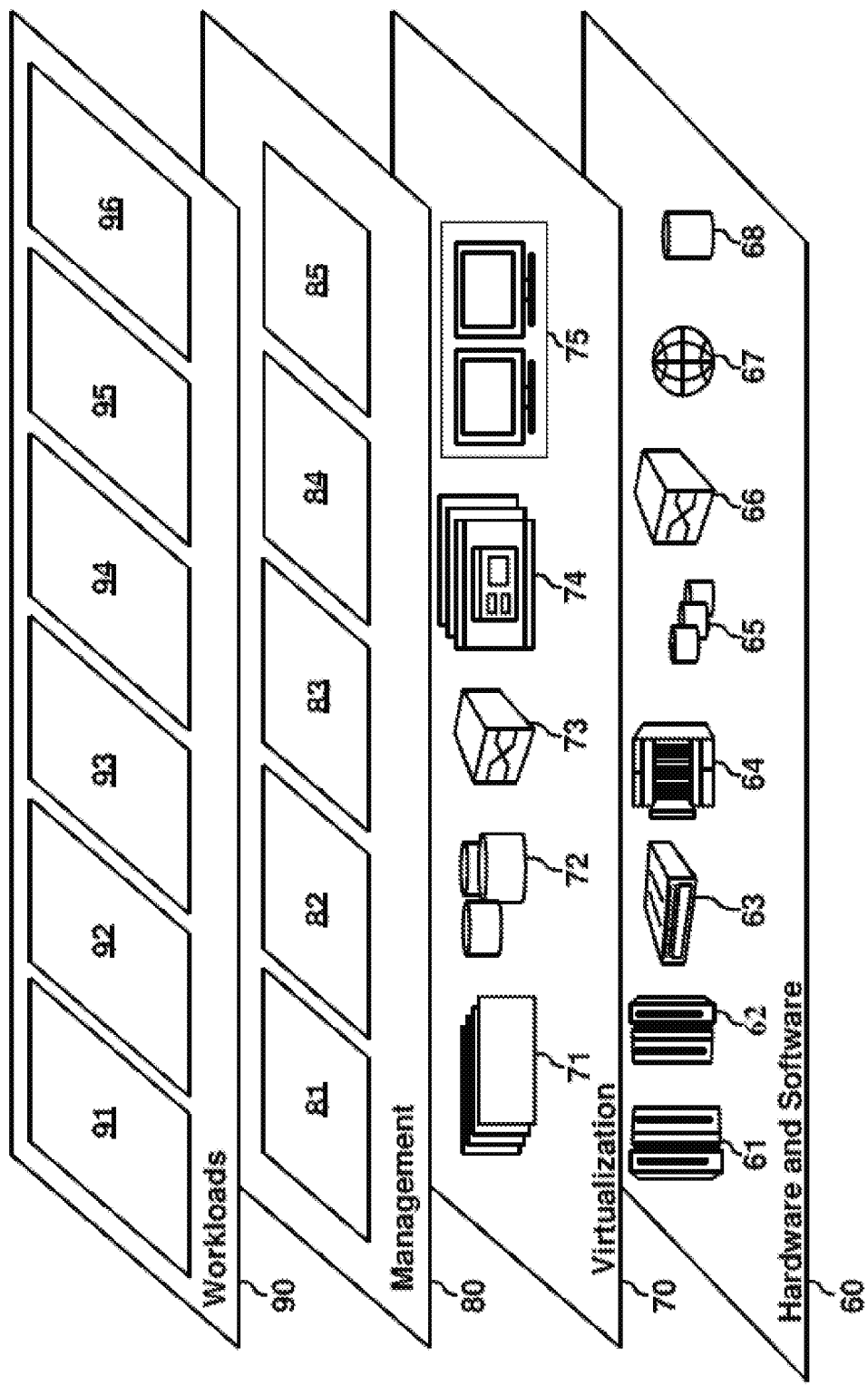
FIG. 4 depicts a cloud computing environment according to at least one embodiment of the present invention.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
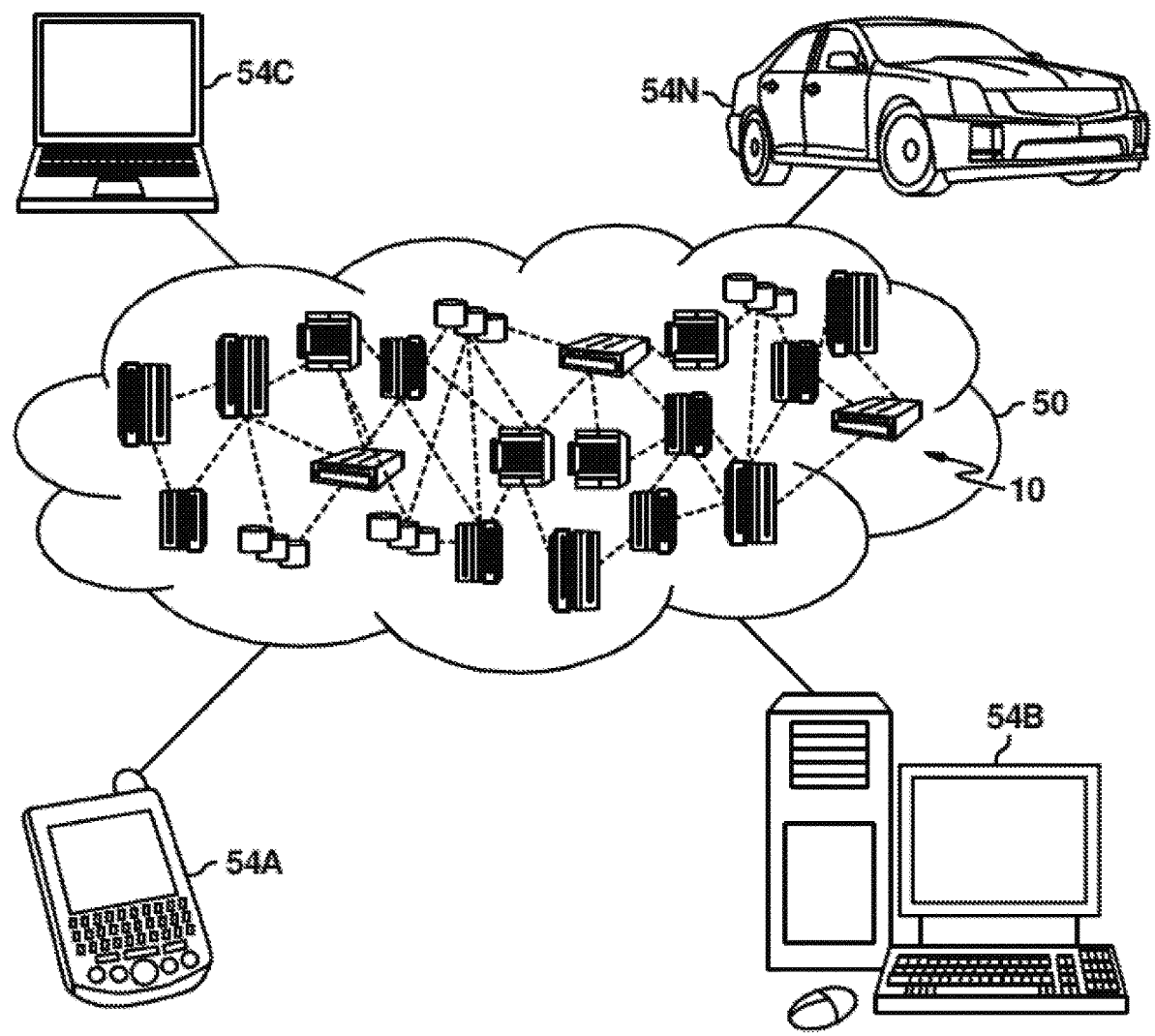
FIG. 5 depicts abstraction model layers according to at least on embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing soothing output 96.

Figure 6:
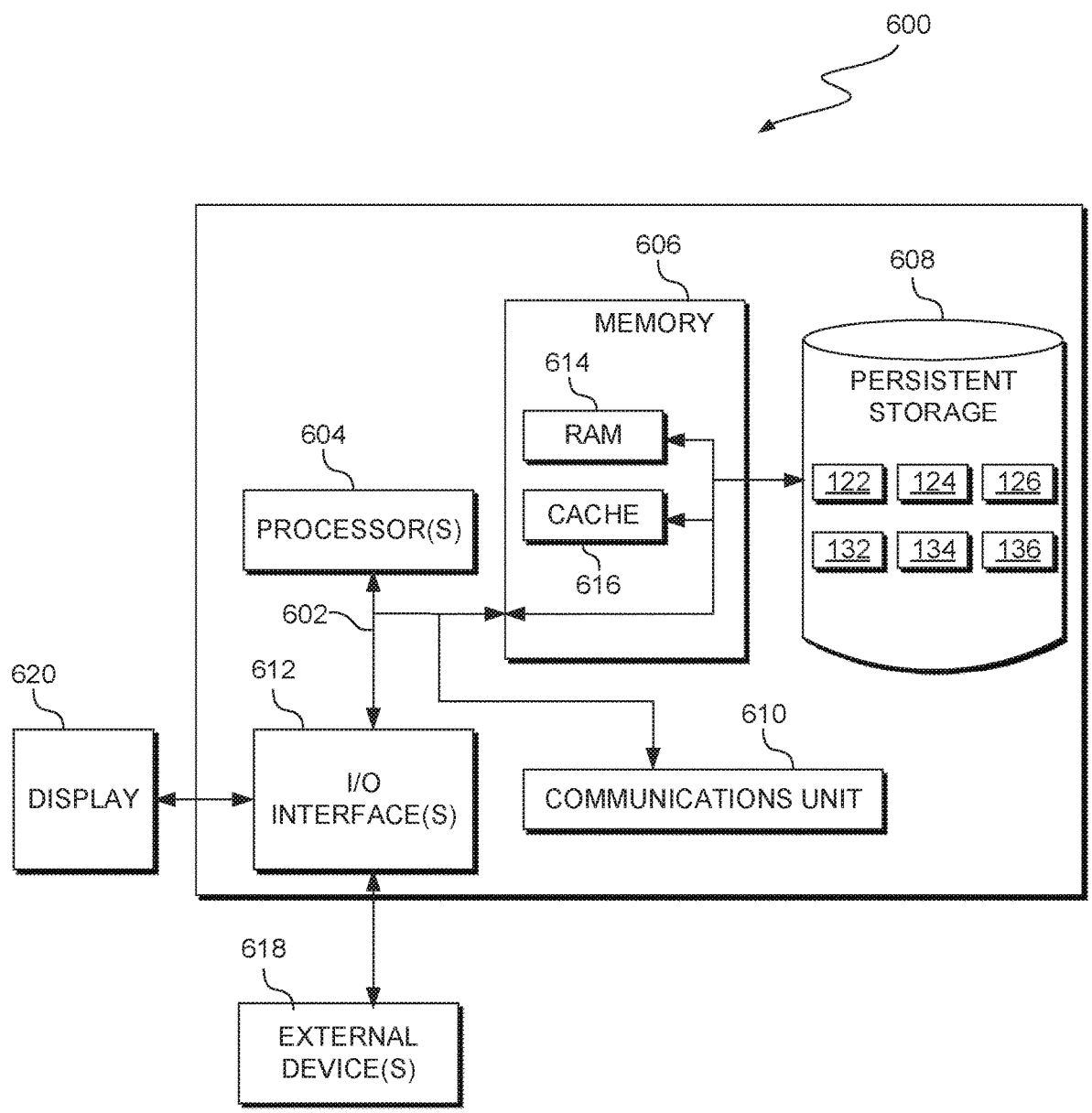
FIG. 6 is a block diagram of components of one or more computing devices within the computing environment depicted of FIG. 1, in accordance with an embodiment of the present invention.

FIG. 6 depicts a block diagram, 600, of components of server device 120 and client device 130, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Server device 120 and client device 130 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 614 and cache memory 616. In general, memory 606 can include any suitable volatile or non-volatile computer-readable storage media.

Encryption program 122, computer interface 124, database 126, client application 132, client interface 134, and external device 136 are stored in persistent storage 608 for execution and/or access by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage X08.

Communications unit 610, in these examples, provides for communications with other data processing systems or devices, including resources of network 110. In these examples, communications unit 610 includes one or more network interface cards. Communications unit 610 may provide communications through the use of either or both physical and wireless communications links. Encryption program 122, computer interface 124, database 126, client application 132, client interface 134, and external device 136 may be downloaded to persistent storage 608 through communications unit 610.

I/O interface(s) 612 allows for input and output of data with other devices that may be connected to server device 120 and client device 130. For example, I/O interface 612 may provide a connection to external devices 618 such as a keyboard, keypad, a touch screen, and/or some other suitable input device. External devices 618 can also include portable computer-readable storage media such as, for example, thumb drives, portable optical or magnetic disks, and memory cards. Software and data used to practice embodiments of the present invention, e.g., encryption program 122, computer interface 124, database 126, client application 132, client interface 134, and external device 136, can be stored on such portable computer-readable storage media and can be loaded onto persistent storage 608 via I/O interface(s) 612. I/O interface(s) 612 also connect to a display 620.

Display 620 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) such as, for example, "Smalltalk" and the like may be subject to trademark rights in various jurisdictions throughout the world and are used here only in reference to the products or services properly denominated by the marks to the extent that such trademark rights may exist.

What is claimed is:

1. A computer-implemented method, the method comprising:
   receiving, by one or more processors, a request from an application on a remote device, wherein the request is to store data on an external storage device;
   validating, by one or more processors, that the application is running in protected space on the remote device and includes an established unique identifier;
   generating, by one or more processors, utilizing data of the validating an encryption key for the external storage device, wherein the encryption key is utilized for user authentication and to authenticate the remote device for subsequent read/write of data to the external device; and
   sending, by one or more processors, the encryption key to the application with instructions for the application to reformat the external storage device, and store the requested data on the external storage device, and encrypt the external storage device using the encryption key.

2. The computer-implemented method of claim 1, wherein the established unique identifier includes data unique to the external storage device.

3. The computer-implemented method of claim 1, wherein sending the encryption key to the remote device further includes sending instructions to store the encryption key on random-access memory (RAM) of the remote device.

4. The computer-implemented method of claim 3, wherein sending the encryption key to the remote device further includes sending instructions to delete the encryption key from RAM if one or more of the following is detected selected from the group consisting of: (i) suspicious behavior, (ii) the application on the remote device is closed, quit, or terminated, (iii) the external storage device is ejected from the remote device, (iv) the remote device is shut down or rebooted, (v) a user's authentication credentials are expired or revoked, and (vi) a threshold value timeout period elapses.

5. The computer-implemented method of claim 1, the method further comprising:
   authenticating, by the one or more processors, that a user of the application on the remote device does not have access to one or more shared encrypted communications; and
   authorizing, by the one or more processors, the user of the application on the remote device to read/write the data to the encrypted external storage device.

6. The computer-implemented method of claim 1, the method further comprising:
   upon sending the encryption key to the remote device, monitoring, by the one or more processors, the remote device for: (i) the established unique identifier, and (ii) the encryption key.

7. The computer-implemented method of claim 6, the method further comprising:
   determining, by the one or more processors, based on the monitoring, that the encryption key is missing from random-access memory of the remote device;
   revalidating, by the one or more processors, that the application is running in the protected space on the remote device and includes the established unique identifier;
   generating, by the one or more processors, a new encryption key for the external storage device, based on, at least in part, on the revalidating; and
   sending, by the one or more processors, the new encryption key to the application with authorization for the application to reformat the external storage device, encrypt the external storage device using the new encryption key, and permit a user of the application to read/write to the encrypted external storage device.

8. A computer system, the computer system comprising:
   one or more computer processors;
   one or more computer readable storage medium; and
   program instructions stored on the computer readable storage medium for execution by at least one of the one or more processors, the stored program instructions comprising:

program instructions to identify a plurality of independently separable aspects of a multimedia file;
program instructions to receive a request from an application on a remote device, wherein the request is to store data on an external storage device;
program instructions to validate that the application is running in protected space on the remote device and includes an established unique identifier;
program instructions to generate utilizing data of the validating an encryption key for the external storage device, wherein the encryption key is for user authentication and utilized to authenticate the remote device for subsequent read/write of data to the external device; and
program instructions to send the encryption key to the application with instructions for the application to reformat the external storage device, store the requested data on the external storage device, and encrypt the external storage device using the encryption key.

9. The computer system of claim 8, wherein the established unique identifier includes data unique to the external storage device.

10. The computer system of claim 8, wherein sending the encryption key to the remote device further includes sending instructions to store the encryption key on random-access memory (RAM) of the remote device.

11. The computer system of claim 8, the stored program instructions further comprising:
program instructions to authenticate that a user of the application on the remote device does not have access to one or more shared encrypted communications; and
program instructions to authorize the user of the application on the remote device to read/write the data to the encrypted external storage device.

12. The computer system of claim 8, the stored program instructions further comprising:
program instructions to monitor the remote device for: (i) the established unique identifier, and (ii) the encryption key, upon sending the encryption key to the remote device.

13. The computer system of claim 12, the stored program instructions further comprising:
program instructions to determine, based on the monitoring, that the encryption key is missing from random-access memory of the remote device;
program instructions to revalidate that the application is running in the protected space on the remote device and includes the established unique identifier;
program instructions to generate a new encryption key for the external storage device, based on, at least in part, on the revalidating; and
program instructions to send the new encryption key to the application with authorization for the application to reformat the external storage device, encrypt the external storage device using the new encryption key, and permit a user of the application to read/write to the encrypted external storage device.

14. A computer-implemented method, the method comprising:
receiving, by one or more processors, a request from an application on a remote device, wherein the request is to store data on an external storage device;
validating, by one or more processors, that the application is running in protected space on the remote device and includes an established unique identifier;
generating, by one or more processors, a previously un-stored encryption key for the external storage device based, at least in part, on the validating, wherein the encryption key is utilized for user authentication and to authenticate the remote device for subsequent read/write of data to the external device; and
sending, by one or more processors, the encryption key to the application with instructions for the application to reformat the external storage device, and store the requested data on the external storage device, and encrypt the external storage device using the encryption key.

15. The computer-implemented method of claim 14, wherein the established unique identifier includes data unique to the external storage device.

16. The computer-implemented method of claim 14, wherein sending the encryption key to the remote device further includes sending instructions to store the encryption key on random-access memory (RAM) of the remote device.

17. The computer-implemented method of claim 16, wherein sending the encryption key to the remote device further includes sending instructions to delete the encryption key from RAM if one or more of the following is detected selected from the group consisting of: (i) suspicious behavior, (ii) the application on the remote device is closed, quit, or terminated, (iii) the external storage device is ejected from the remote device, (iv) the remote device is shut down or rebooted, (v) a user's authentication credentials are expired or revoked, and (vi) a threshold value timeout period elapses.

18. The computer-implemented method of claim 14, the method further comprising:
authenticating, by the one or more processors, that a user of the application on the remote device does not have access to one or more shared encrypted communications; and
authorizing, by the one or more processors, the user of the application on the remote device to read/write the data to the encrypted external storage device.

19. The computer-implemented method of claim 14, the method further comprising:
upon sending the encryption key to the remote device, monitoring, by the one or more processors, the remote device for: (i) the established unique identifier, and (ii) the encryption key.

20. The computer-implemented method of claim 19, the method further comprising:
determining, by the one or more processors, based on the monitoring, that the encryption key is missing from random-access memory of the remote device;
revalidating, by the one or more processors, that the application is running in the protected space on the remote device and includes the established unique identifier;
generating, by the one or more processors, a new encryption key for the external storage device, based on, at least in part, on the revalidating; and
sending, by the one or more processors, the new encryption key to the application with authorization for the application to reformat the external storage device, encrypt the external storage device using the new encryption key, and permit a user of the application to read/write to the encrypted external storage device.

* * * * *